United States Patent [19]

Colamussi

[11] Patent Number: 4,899,866
[45] Date of Patent: Feb. 13, 1990

[54] APPARATUS FOR THE ORDERED ARRANGEMENT AND CREATION OF A FEED STOCK IN BOXING PLANTS FOR CONES AND/OR CONOIDS

[75] Inventor: Arturo Colamussi, Ferrara, Italy

[73] Assignee: Vortex Systems S.r.l., Fossalta di Copparo, Italy

[21] Appl. No.: 214,390

[22] Filed: Jul. 1, 1988

[51] Int. Cl.⁴ .............................................. B65G 47/26
[52] U.S. Cl. .................................. 198/418.1; 198/442; 198/463.6
[58] Field of Search ............ 198/389, 436, 442, 418.1, 198/419.1, 466.1, 463.6; 53/531, 497

[56] References Cited

U.S. PATENT DOCUMENTS 2,451,104 10/1948 Lowe .................................... 198/442
2,878,919 3/1959 Jones ................................ 198/419.1
3,209,512 10/1965 Ferguson et al. ................. 198/418.1
4,498,273 2/1985 Colamussi ........................... 198/389

*Primary Examiner*—Joseph E. Valenza
*Attorney, Agent, or Firm*—Charles E. Brown; Charles A. Brown

[57] ABSTRACT

An apparatus for the ordered arrangement and creation of a feed stock in boxing plants for cones and/or conoids, for positioning after first conveyors which feed a stream of individual cones one after another, comprising a splitter unit for splitting in two the stream of cones flowing from the first conveyors towards second conveyors which follow the splitter unit. An escapement mechanism disposed at the other end of the second conveyors and a pusher and positioning unit for transferring the cones towards containing devices, to provide good accumulation of cones and their regular downstream feed.

6 Claims, 5 Drawing Sheets

APPARATUS FOR THE ORDERED ARRANGEMENT AND CREATION OF A FEED STOCK IN BOXING PLANTS FOR CONES AND/OR CONOIDS

This invention relates to an apparatus for the ordered arrangement and creation of a feed stock in boxing plants for cones and/or conoids.

In boxing plants for cones and/or conoids of food type originating from heating, drying, baking, cooling or deep-freezing processes it is necessary to prearrange them and continuously feed them in a predetermined ordered arrangement to a boxing and packaging region or apparatus.

In this respect, because of their particular shape, to obtain the best possible arrangement in a container box they must undergo predetermined ordered arrangement, checking and uniform distribution in determined number in a region which precedes that in which they are packed into boxes.

An object of the present invention is to provide an apparatus for incorporation into a boxing plant which is able to solve said problems by arranging the cones in proper order and simultaneously forming a stock to ensure continuous feed for packaging.

This and further objects are attained according to the present invention by an apparatus for the ordered arrangement and creation of a feed stock in boxing plants for cones and/or conoids, for positioning after first conveyor means which feed a stream of individual cones one after another, characterised by comprising a frame in which means are disposed for splitting in two the stream of said cones flowing from said first conveyor means toward second conveyor means which follow said splitting means, an escapement mechanism disposed at the other end of said second conveyor means and a pusher and positioning unit for transferring said cones towards containing means.

The structural and operational characteristics and advantages of an apparatus according to the present invention will be more apparent from the description given hereinafter by way of non-limiting example with reference to the schematic drawings in which.

Figure 1:
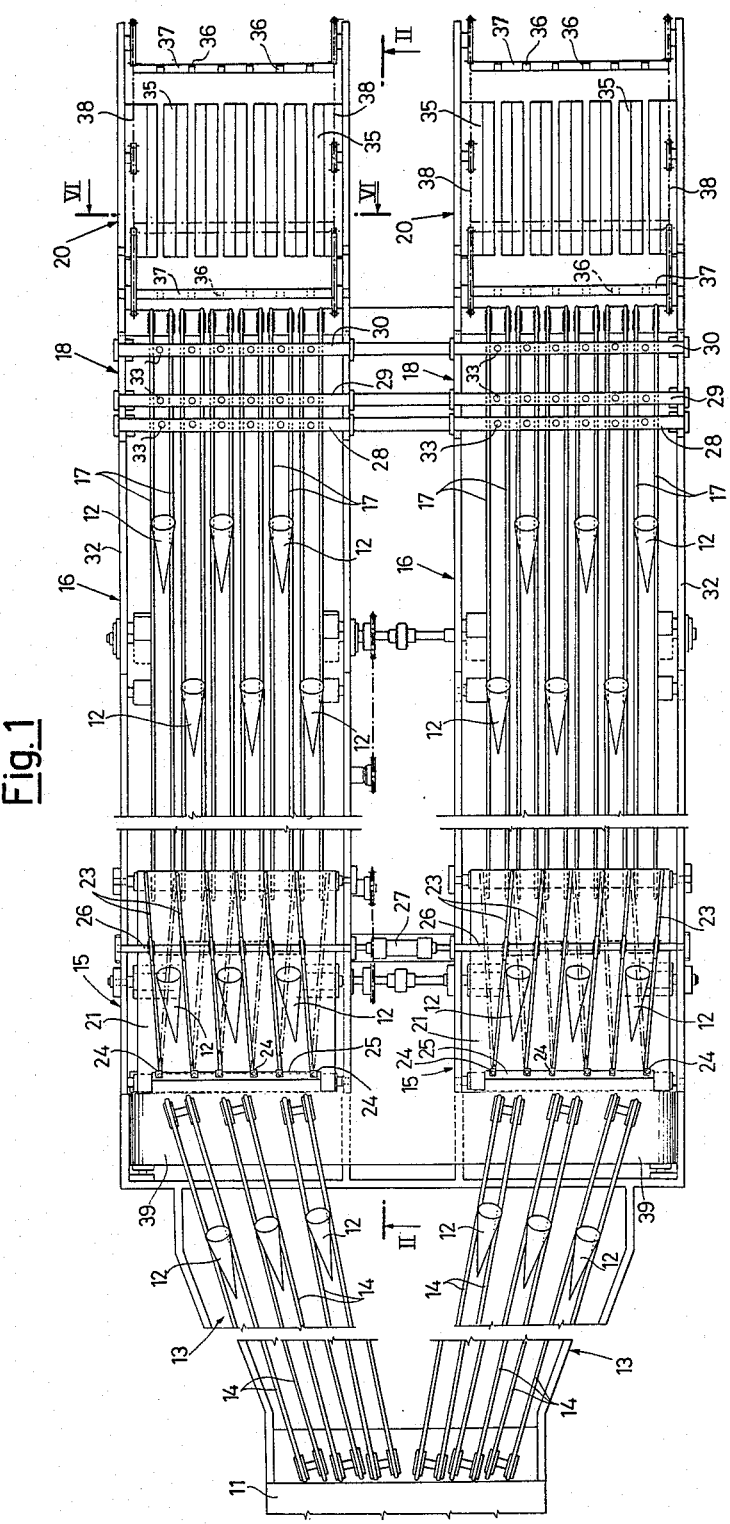
FIG. 1 is a plan view of an apparatus according to the present invention shown by way of example positioned at the exit of a refrigeration tunnel.

With reference to the drawings, an apparatus for the arrangement and creation of a stock according to the present invention is shown by way of example positioned at the exit of a refrigeration tunnel indicated diagrammatically by 11 and containing ice cream cones and/or conoids 12 which are required to be arranged in an ordered arrangement and undergo selection before being boxed.

Two pluralities of first conveyor means 13, each consisting for example of three pairs of conveyor belts 14 and relative underlying V-guides (not shown), feed the cones 12 to a selection unit 15 or flow splitting means which divides the arriving cones 12 among a plurality of second conveyor means 16, such as further pairs of conveyor belts 17.

The further pairs of conveyor belts 17, associated in two groups of six pairs each, form a storage means for said cones 12 in cooperation with an escapement mechanism 18 which acts as a means for halting them and then releasing them stepwise at a given rate in the form of transverse sets each of a predetermined number of cones 12 towards containing means which in the present example are conveying platforms 19.

The various successive transversal sets comprising a predetermined number of cones 12 are transferred to the conveying platforms 19 by a pusher and positioning unit 20 interposed between the escapement mechanism 18 and the containing means 19, these latter for example when filled being movable by an evacuation conveyor means (not shown).

The pairs of conveyor belts 14 diverge in the direction of the selection unit 15 so that this has space to split the stream of fed cones 12. The selection unit 15 comprises a mobile base conveyor band 21, for example driven at 22, which advances the cones 12 within pairs of lateral guide bars 23 which are pivoted at one end at 24 on a transverse element 25 positioned at the exit of the first conveyor means 13.

The pairs of guide bars 23 are also hinged on a second transverse element 26 which is disposed transversely in correspondence with an intermediate portion of these bars and is subjected to to-and-fro movement by an actuator cylinder 27 operated at predetermined time intervals.

This to-and-fro movement is equal to the distance between the axes of two runways defined by adjacent pairs of conveyor belts and enables the channels defined by the pair of lateral guide bars 23 to be aligned with respective alternate runways formed by the pairs of conveyor belts 17 of the second conveyor means 16, and which in the illustrated example are six in number for each of the two groups.

Figure 2:
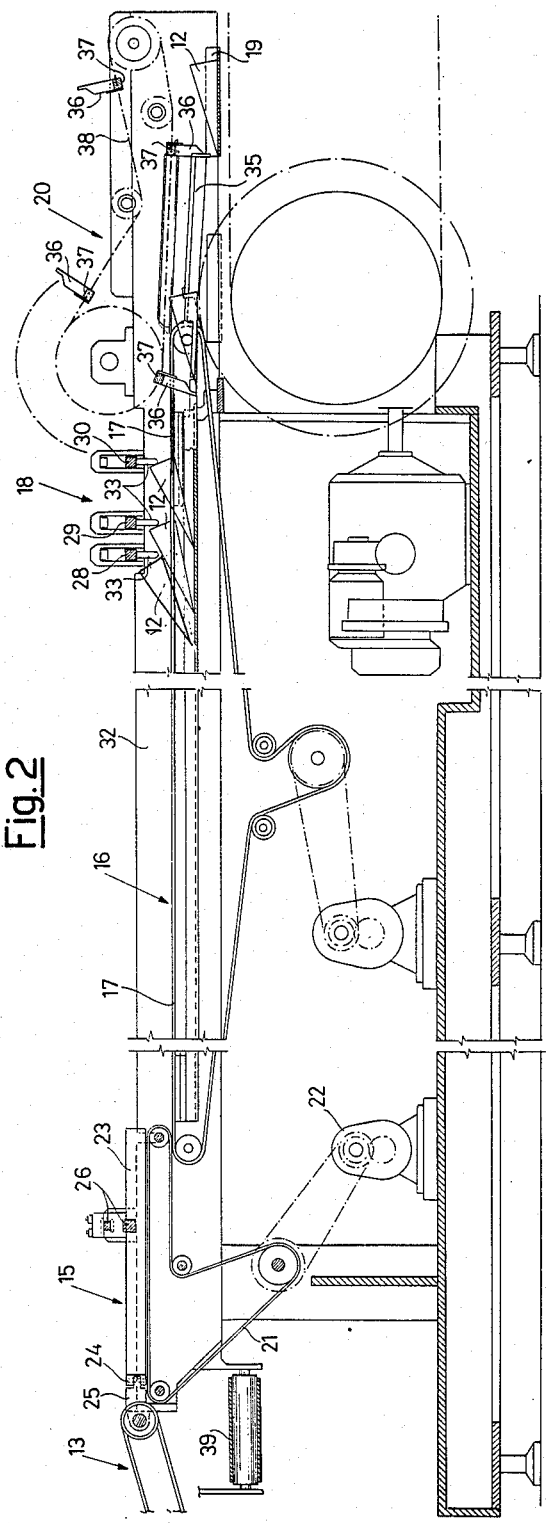
FIG. 2 is a longitudinal section on the line II—II of FIG. 1.
Figure 3:
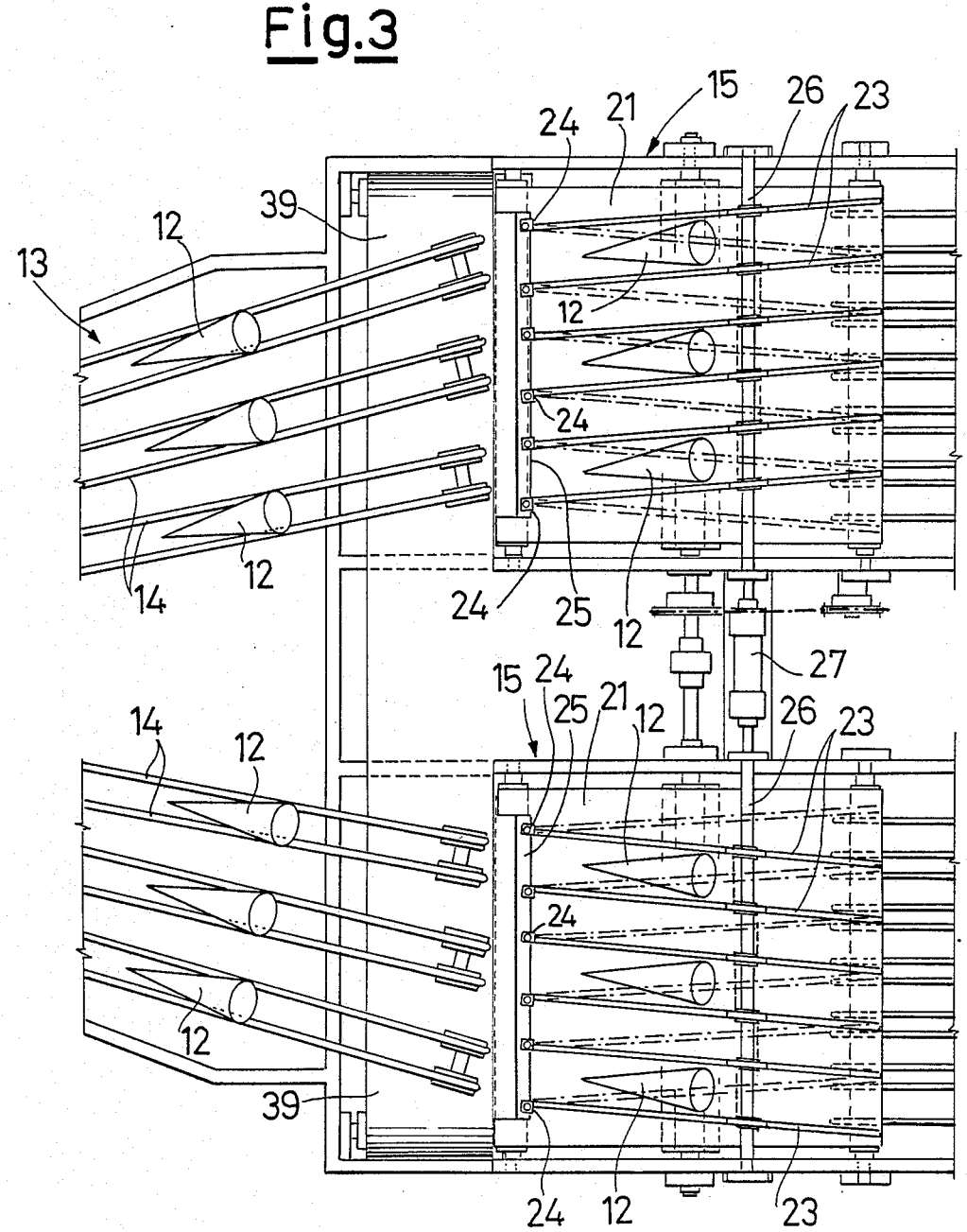
FIG. 3 is a plan view of a detail of FIG. 1.
Figure 4:
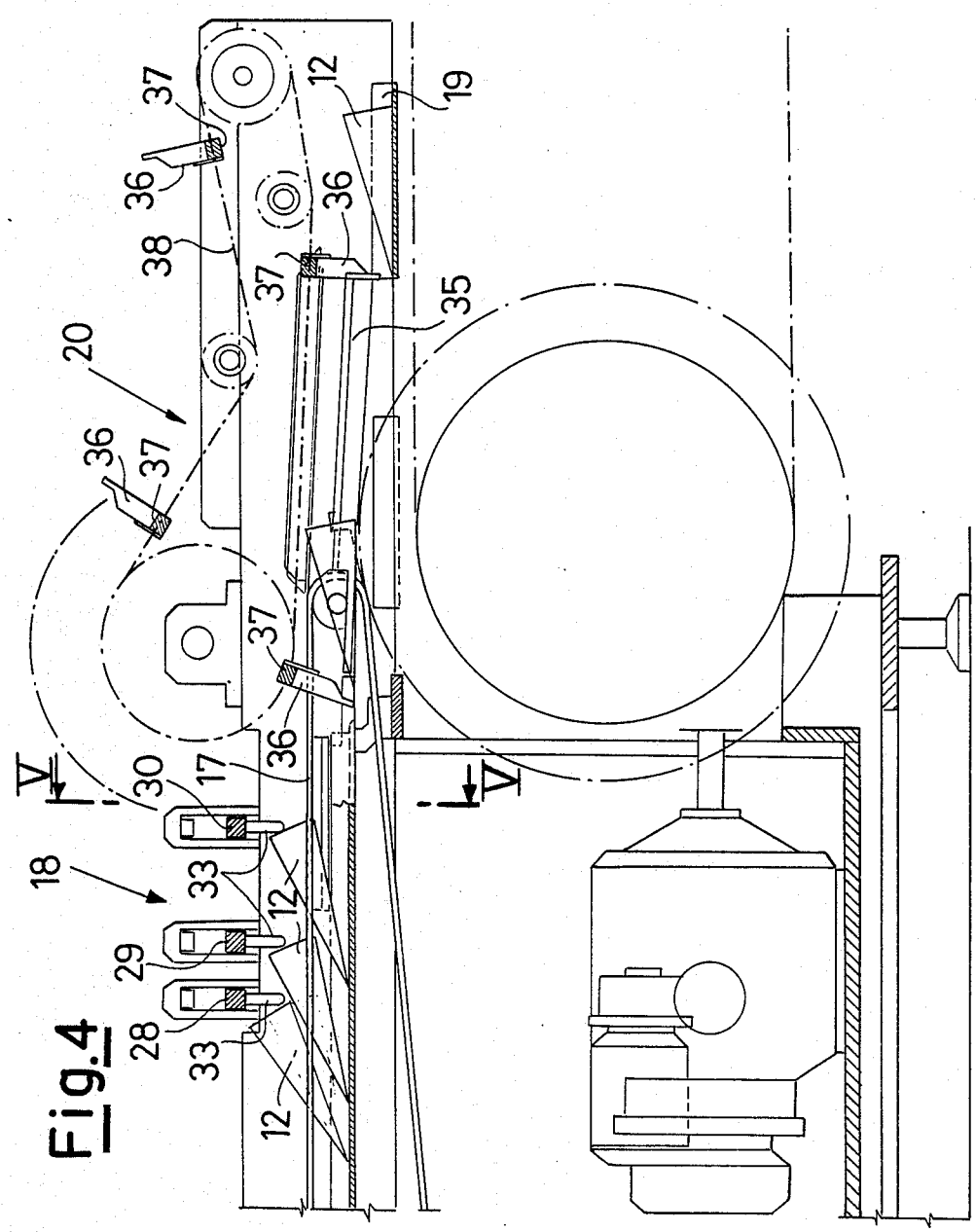
FIG. 4 is an elevation of a detail of FIG. 2.
Figure 5:
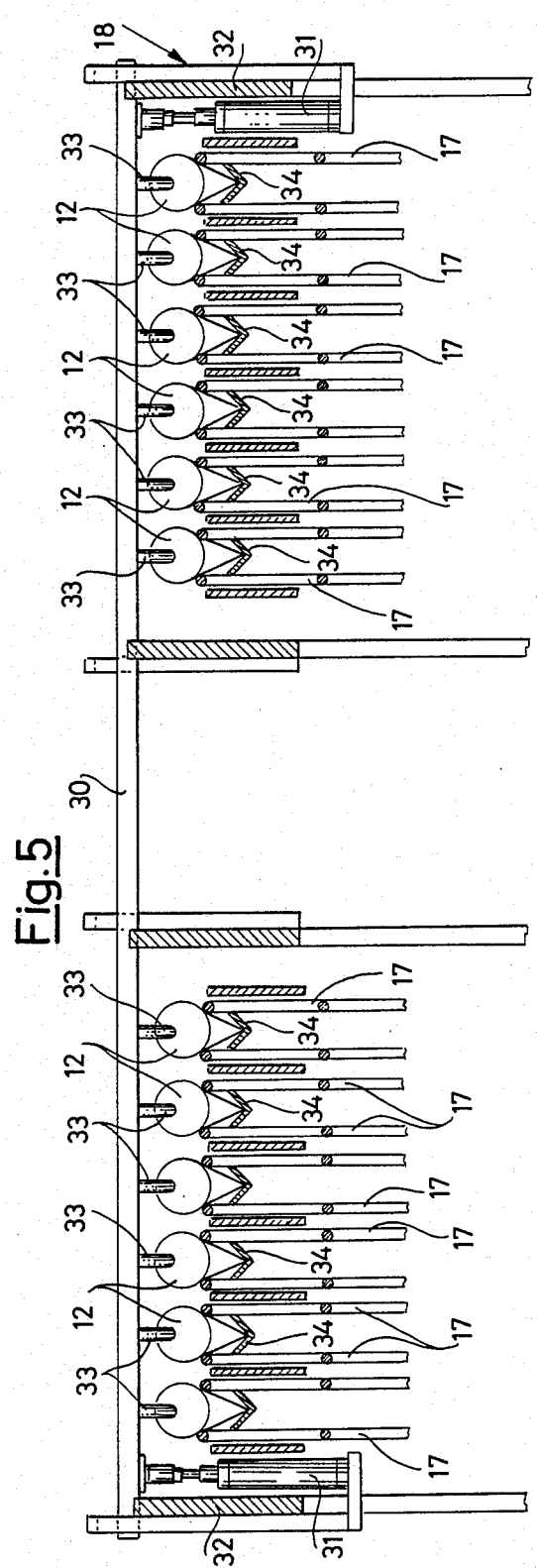
FIG. 5 is a cross-section on the line V—V of FIG. 4.
Figure 6:
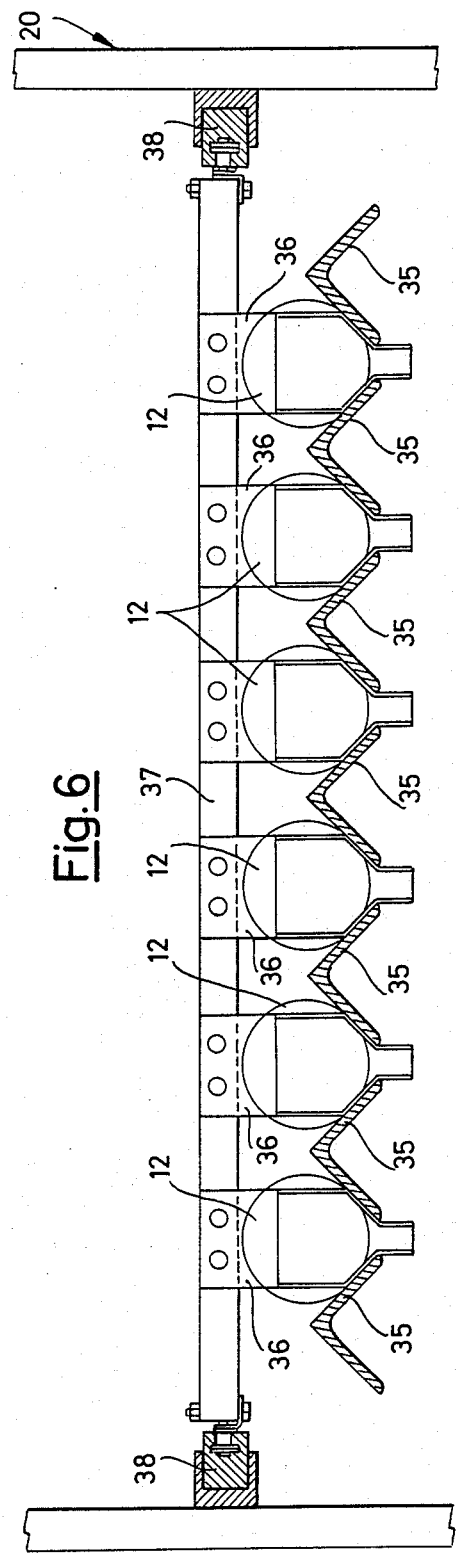
FIG. 6 is a cross-section on the line VI—VI of FIG. 1.

The cones 12 thus disposed on the pairs of conveyor belts 17, which comprise lower central V-section guides 34 to keep the individual cones 12 in a lying-down position (FIGS. 2 and 3), are accumulated in the illustrated example within the twelve runways at the escapement mechanism 18. Said escapement mechanism consists essentially of transverse elements 28, 29 and 30 which can be moved essentially vertically by actuator cylinders 31 disposed in proximity to the frame 32 of the apparatus according to the invention. The transverse elements 28, 29, 30 are spaced apart such that the distance between the elements 28 and 29 is at least slightly less than the distance between one cone and the next on the same runway when they are in a state of accumulation on the conveyor belts 17, and the distance between the elements 29 and 30 is at least slightly greater than said distance between the cones. This is to prevent an individual cone being pressed upon by the weight of the subsequent cones at the moment of its release when the transverse element is raised by the cylinder 31, with the result that the start of its movement is delayed and its arrival in correct phase with the pusher and positioning unit 20 is compromised.

Preferably the transverse elements 28, 29 and 30 comprise a number of downwardly projecting peg elements 33 equal to the number of pairs of conveyor belts 17 of the second conveyor means 16.

Almost in proximity to the terminal portion of said pairs of conveyor belts 17, the cones 12 released by the escapement mechanism 18 pass onto a chute portion formed by further fixed inverted V-shaped guides 35 slightly inclined towards the conveying and resting platforms 19 for said cones. In this chute portion the rear ends of the cones resting thereon are urged longitudinally forwards by a series of pusher elements 36 disposed rigidly on endless transmission means. For example, said pusher elements 36 are disposed on transverse bars 37 driven by a transmission formed from endless chains 38. The pusher elements 36 are suitably spaced apart along the transmissions formed from the pairs of chains 38 so as to feed the successively arriving conveying platforms 19 with transverse sets of a predetermined number of cones 12 by the said evacuation conveyor means.

The use of an apparatus according to the present invention provided with a flow splitting means in a boxing plant advantageously enables each individual stream of cones leaving the production zone to be divided into two separate adjacent streams, so speeding up the entire plant.

The second conveyor means and the escapement mechanism form a store able to continuously and synchronously feed the box filling devices with sets of spaced-apart cones in properly ordered arrangement.

Preferably, a collection element 39 is advantageously provided at the inlet to said flow splitting means 15, into which the cones 12 continuously fed along said two series of first conveyor means 13 can be made to fall when said storage means is saturated and full due to any unscheduled stoppage of the boxing plant.

In this case, said first conveyor means are for example retracted through a space sufficient to allow the arriving cones to fall onto the underlying collection element 39, which in this example is a conveyor belt.

I claim:

1. An apparatus for the ordered arrangement and creation of a feed stock in boxing plants for cones and/or conoids, for positioning after first conveyor means which feed a stream of individual cones one after another, characterised by comprising a frame in which means are disposed for splitting in two the stream of the cones flowing from said first conveyor means towards second conveyor means which follow said splitting means, an escapement mechanism disposed at the other end of said second conveyor means and a pusher and positioning unit for transferring the cones towards containing means, said escapement mechanism comprising a set of three transverse elements which are mobile essentially vertically to halt and release sets of a predetermined number of the cones, a first and second of said transverse elements being spaced apart by a distance less than the distance between two successive cones and the second and third of said transverse element being spaced apart by a distance higher than said distance between two successive cones.

2. An apparatus as claimed in claim 1, characterised in that said flow splitting mean consists of a mobile base belt over which there are positioned pairs of guide bars which are provided at one end to a first transverse element and are hinged to a second transverse element which is mobile between two end positions selectively aligned with said second conveyor means, and wherein said apparatus includes two first conveyors, each of said two first conveyors having pairs of belts and relative V-grooves and two movable base conveyor bands which advance the cones within pairs of lateral guide bars, said lateral guide bars being actuated in a to-and-fro movement by a single central actuator, and said single central actuator maintains said pairs of lateral guide bars in spaced relationship with one another.

3. An apparatus as claimed in claim 1, characterised in that said first and second conveyor means are a plurality of pairs of conveyor belts operationally combined with lower guides arranged to keep said cones in a lying-down position.

4. An apparatus as claimed in claim 1, characterised in that said pusher unit comprises an endless transmission carrying interspaced pusher elements.

5. An apparatus as claimed in claim 3, characterised in that said pusher unit comprises a number of pusher elements equal to the number of said pairs of conveyor belts of said second conveyor means, disposed rigid with transverse elements connected to a transmission consisting of pairs of endless chains, and lower fixed guides on which said cones pushed by said pusher elements rest.

6. An apparatus as claimed in claim 1, characterised in that said pusher unit comprises an endless transmission carrying interspaced pusher elements, said pusher unit comprises a number of pusher elements equal to the number of said pairs of conveyor belts of said second conveyor means, disposed rigid with transverse elements connected to a transmission consisting of pairs of endless chains, and lower fixed guides on which the cones pushed by said pusher elements rest.

* * * * *